United States Patent [19]
Tang et al.

[11] Patent Number: 5,726,892
[45] Date of Patent: Mar. 10, 1998

[54] ENGINE SPEED PREDICTION METHOD FOR ENGINE CONTROL

[75] Inventors: Dah-Lain Tang, Canton; Man-Feng Chang, Troy, both of Mich.

[73] Assignee: General Motors Corporation, Detroit, Mich.

[21] Appl. No.: 733,565

[22] Filed: Jul. 22, 1991

[51] Int. Cl.$^6$ .................................................... F02P 5/15
[52] U.S. Cl. .................... 364/431.07; 364/431.03; 123/417; 123/418; 123/419
[58] Field of Search .................... 364/431.07, 424.1, 364/431.03, 426.04, 565; 123/414, 417, 418, 419, 609; 73/116; 244/182

[56] References Cited

U.S. PATENT DOCUMENTS

| | | | |
|---|---|---|---|
| 4,277,041 | 7/1981 | Marrs et al. | 244/182 |
| 4,303,977 | 12/1981 | Kobashi et al. | 364/431 |
| 4,351,306 | 9/1982 | Luckman et al. | 123/609 |
| 4,424,568 | 1/1984 | Nishimura et al. | 364/431.07 |
| 4,607,523 | 8/1986 | Takahashi et al. | 73/116 |
| 4,644,917 | 2/1987 | Yakuwa et al. | 123/414 |
| 4,893,244 | 1/1990 | Tang et al. | 364/431.03 |
| 4,905,154 | 2/1990 | Strong et al. | 364/426.04 |
| 4,932,379 | 6/1990 | Tang et al. | 123/436 |

*Primary Examiner*—Kevin J. Teska
*Assistant Examiner*—Tan Nguyen
*Attorney, Agent, or Firm*—Michael J. Bridges

[57] ABSTRACT

Using a plurality of engine position reference pulses for each cylinder event, several reference periods for each cylinder event are defined and the engine speed can be accurately predicted for the current reference period and for future reference periods using position data from only the current combustion interval. For speed control the start of injection and start of spark dwell are computed based on predicted engine speeds for periods after those functions are started. Adaptive prediction gains are used to update the prediction algorithms to reflect the current engine operation conditions and minimize prediction error.

6 Claims, 5 Drawing Sheets

ENGINE SPEED PREDICTION METHOD FOR ENGINE CONTROL

FIELD OF THE INVENTION

This invention relates to a method of engine speed prediction and engine control using the method of engine speed prediction.

BACKGROUND OF THE INVENTION

Electronic controls for automotive internal combustion engines select operating parameters, such as spark timing and fuel injection timing, and duration as calculated from engine speed, mass air flow rate, throttle angle and manifold pressure as the main variables and several less influential factors. The calculation and execution is carried out by a programmed microprocessor having inputs from sensors, such as manifold pressure and crankshaft position sensors. The crankshaft position sensor is the source of information for each cylinder or cylinder pair position from which spark timing and fuel injection are referenced. Engine speed is determined by measuring the time interval between two reference pulses produced by the position sensor and converting the interval to speed. The speed is used as the basis for the control of the fueling and spark firing of the following cylinders. U.S. Pat. No. 4,351,306 to Luckman et al., issued Sep. 28, 1982, is an example of such a system.

The time interval between the reference pulses, known as the reference period, is used to determine the commanded operating parameter angles. The commanded angles are then determined either by counting the reference pulses (known as a position based system) or by converting them into countdown parameters in time (known as a time based system). The commanded parameter angle is not optimal for either system because it is based on the past engine speed, not on the engine speed at the time of execution. This causes timing errors. The errors are particularly significant when the engine speed is changing rapidly from one spark firing event to the next. Then the past engine speed, in itself, is not a good indicator of the future speed, especially when the speed measurement is taken in a previous combustion cycle.

A proposal to detect the trend in speed change and modify the measured speed in accordance with the trend is discussed in U.S. Pat. No. 4,424,568 to Nishimura et al., issued Jan. 3, 1984. There, reference pulses are generated at the top dead center of each cylinder for a four cylinder engine. The pulses then are spaced 180 degrees of crankshaft rotation. The speed N is determined for each reference time by an undisclosed method. Then at each reference time the speeds determined for that time and for the previous reference time are used to calculate a predicted speed two reference periods in the future thereby introducing an opportunity for calculation error. That is, the information used to calculate the predicted speed is at least one engine revolution old by the time the speed is utilized. The prediction is expressed in the form $N_5=N_3+X(N_3-N_2)$ where X is a weighting constant. The first term is a base speed and the difference term is a measure of acceleration to adjust for the speed trend. After the spark angle is calculated using the predicted speed, the firing can only be executed by calculating a waiting time interval from a reference pulse which is far from the spark angle, thus introducing the opportunity for a major delivery error.

The U.S. Pat. No. 4,893,244 to Tang et al., issued Jan. 9, 1990, teaches a method of predicting engine speed of the period immediately following a reference pulse to determine spark timing. That method uses the most current available speed measurements and takes into account the cyclic pattern of an internal combustion engine. That method avoids introducing errors due to using data from prior combustion periods and produces good results. There is, however a need to predict the speed during the spark interval at an earlier time to predict engine speed error, calculate operating parameters necessary to reduce or eliminate the speed error, and, when necessary, to begin operations prior to the spark interval. In particular, it is often necessary to begin spark dwell for charging the spark coil and to begin fuel injection during an interval prior to the spark interval.

SUMMARY OF THE INVENTION

It is therefore an object of this invention to provide a method of engine speed prediction using information developed in the current combustion cycle yet well in advance of the time to begin spark dwell or fuel injection to optimize the engine parameters for engine control.

The invention is carried out by a method of predicting engine speed for controlling an internal combustion engine having a plurality of cylinders comprising the steps of: generating a plurality of crankshaft position reference pulses for each firing event to thereby define a plurality of reference periods for each firing event; measuring reference periods between adjacent reference pulses; determining a trend of reference period change by comparing the most recent reference period with an earlier period; projecting a future reference period at least one period beyond the current period by selecting a measured reference period from the most recently completed firing event as a base period, the base period having the same position in its firing event as the future reference period occupies in its respective firing event, determining a gain factor, and calculating the future reference period from the base period as adjusted by the product of the reference period change and the gain factor.

BRIEF DESCRIPTION OF THE DRAWINGS

The above and other advantages of the invention will become more apparent from the following description taken in conjunction with the accompanying drawings wherein like references refer to like parts.

DESCRIPTION OF THE INVENTION

Figure 1:
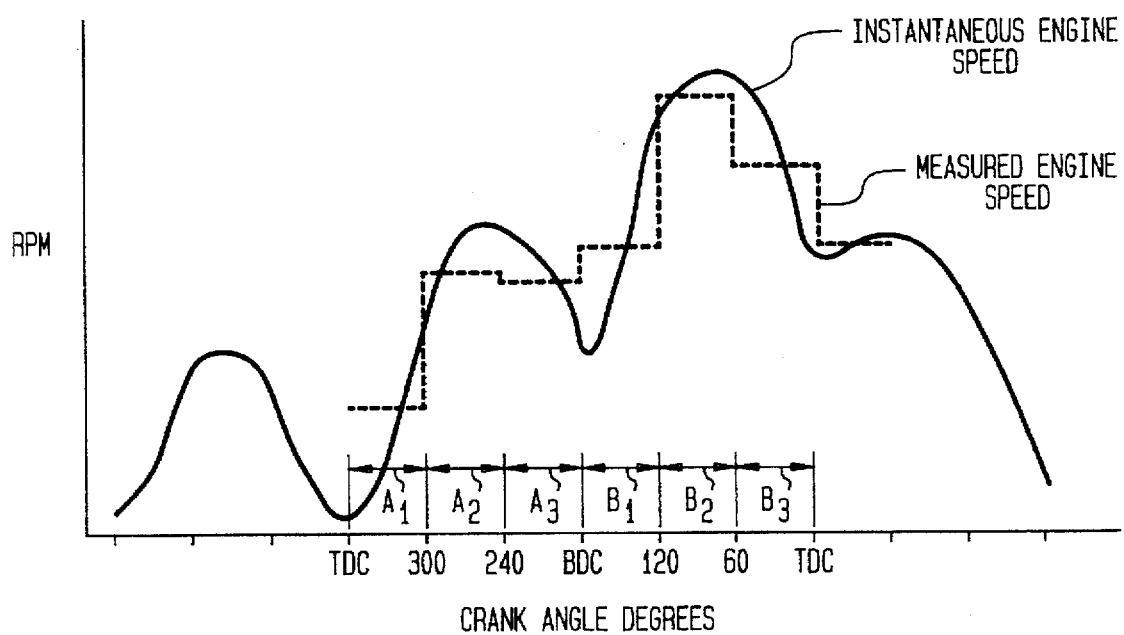
FIG. 1 is a graph showing the variation of engine speed with crank angle and reference periods for a four cylinder engine with six reference pulses per crankshaft revolution.

The ensuing description is directed to a four cylinder engine controlled according to the method of the invention using six reference pulses per engine revolution or each 60 degrees of crankshaft angle. Other multi-cylinder engines, such as six and eight cylinder engines, may also make use of the invention. The benefits of the invention are best realized when there are a number of references per firing event. Thus, a six or eight cylinder engine may well use reference pulses 30 degrees apart.

In any event, there should be enough reference pulses to define at least two and preferably three reference periods per cylinder event to enable the prediction of reference periods beyond the current period. The description expresses engine position in terms of crankshaft angle. The angular range beginning at one top dead center (TDC) position and extending to the next TDC is called a combustion interval which is 360 degrees for a four cylinder engine, and the period extending between BDC and TDC is called a cylinder event which is 180 degrees for a four cylinder engine. Typically, one spark event occurs within each cylinder event and several degrees prior to TDC. Since reference speed is the reciprocal of reference period either may be used for the algorithms set forth herein.

Engine speed or reference periods are predicted at various reference locations to provide accurate estimated future speed information needed, at different upcoming reference periods, for effective control of the powertrain system. The average speed in reference periods other than the one in which the spark is fired is needed, for example, in deciding the time to open the fuel injectors and to start charging the spark coils. In controlling the fuel injection, the injector needs to be opened for a certain time interval, usually referred to as fuel pulse width, before it is to be closed and the intake valve opens (IVO).

In this case, the time interval from the current reference pulse to IVO has to be estimated first, then the fuel pulse width is subtracted from that value to determine whether and when the injector should be opened in this current reference period (before the next reference pulse). To control this task accurately may require the estimation of the engine speed several times in several consecutive reference periods. The prediction may involve not only the full reference periods between reference pulses, but to increase accuracy, time intervals of fractional crank angle periods between reference pulses which may be obtained by interpolation between adjacent full reference periods.

The same predictions can be done for spark dwell timing control. To ignite the spark plug, the spark coil needs to be charged for a certain time, usually referred to as the spark dwell. The time interval from the last reference pulse to the time when spark occurs has to be estimated first, then subtracting from that value the required spark dwell to determine whether and when the charge of the coil should begin in this current reference period (before the next reference pulse).

FIG. 1 is a graph of the variation of engine speed with crank angle for a four cylinder engine with superimposed reference pulses at 60 degrees intervals defining six reference periods. Each TDC and bottom dead center (BDC) occurs at a local low speed and the peaks are indicative of speed maxima due to combustion in each of the cylinders. The increasing amplitude of the first three peaks signifies engine acceleration and the fourth, lower peak signifies deceleration, possibly due to misfire. The periods in the cylinder event between the first TDC and BDC are labeled $A_1$, $A_2$ and $A_3$, respectively, and the periods in the next cylinder event between BDC and the second TDC are labeled $B_1$, $B_2$ and $B_3$, respectively.

It may be noted that corresponding periods within each cylinder event have the same subscript; i.e., $A_1$ and $B_1$ both occur just after a minima at the rising part of the curve and can be expected to have the same value when engine speed is steady. Also, the periods carrying subscripts 1 and 3 are symmetrically disposed relative to a speed peak and may also be the same for the steady speed case and any difference of values may be used as a measure of acceleration. In addition, the periods which are symmetrically disposed about the BDC, $A_3$ and $B_1$, are likewise about the same for steady speeds and their difference can be used as a measure of the speed trend during acceleration.

It is generally desired to predict the period $B_3$ which is used as a measure of engine speed for comparison to a target engine speed, and is also the most likely period for spark occurrence. The period $B_3$ can be predicted at BDC (or 180 degrees), at 120 degrees or at 60 degrees before TDC. The method of predicting the current period at 60 degrees (just after the pulse at 60 degrees is received) is already known from the disclosure of U.S. Pat. No. 4,893,244 to Tang et al., but different algorithms are required for the more distant predictions. The prediction of periods $B_1$ and $B_2$ can also be made. The following table lists the formulas for the prediction of each reference period at (immediately following) the last received pulse which may occur at 180 degrees, 120 degrees or 60 degrees. The asterisks mark the formulas which calculate a current reference period, i.e., the calculation is taking place during the period which is being predicted. The remaining formulas predict future periods.

| LAST PULSE | FORMULA |
| --- | --- |
| 180 degrees | $B_3 = A_3 + G_1(A_3 - A_1)$ |
| 120 degrees | $B_3 = A_3 + G_2(B_1 - A_3)$ |
| 60 degrees | * $B_3 = A_3 + G_3(B_2 - A_2)$ |
| 180 degrees | $B_2 = A_2 + G_4(A_3 - A_1)$ |
| 120 degrees | * $B_2 = A_2 + G_5(B_1 - A_3)$ |
| 180 degrees | * $B_1 = A_1 + G_6(A_3 - A_1)$ |

Thus, in each case, the predicted value is equal to a base value which corresponds to the value of the period occupying the equivalent position in the previous cylinder event, and adjusted by the acceleration (deceleration). The acceleration is determined by the product of a gain $G_m$ and the difference between the last period measured and a symmetrically related prior period. The gain term $G_m$ has a default value which can be stored in a table as a function of engine speed and load and is empirically determined to provide a probable value to accurately project the base value to the predicted value, but which preferably is adaptively adjusted after the actual period is measured to compensate for any error in the predicted value. Thus $G_1$ is updated to $$G_1' = G_1 + K_1[B_3(\text{actual}) - B_3(\text{pred. at 180 degrees})]$$

where the factor $K_1$ is an adaptive gain having a value between 0 and 1. In general the value of $G_m$ is its previous value updated by an amount proportional to the measured error. While a fixed value for each gain $G_m$ may be used, the adaptive updating scheme provides a more accurate value and thus a better prediction of the reference period and engine speed.

Figure 2:
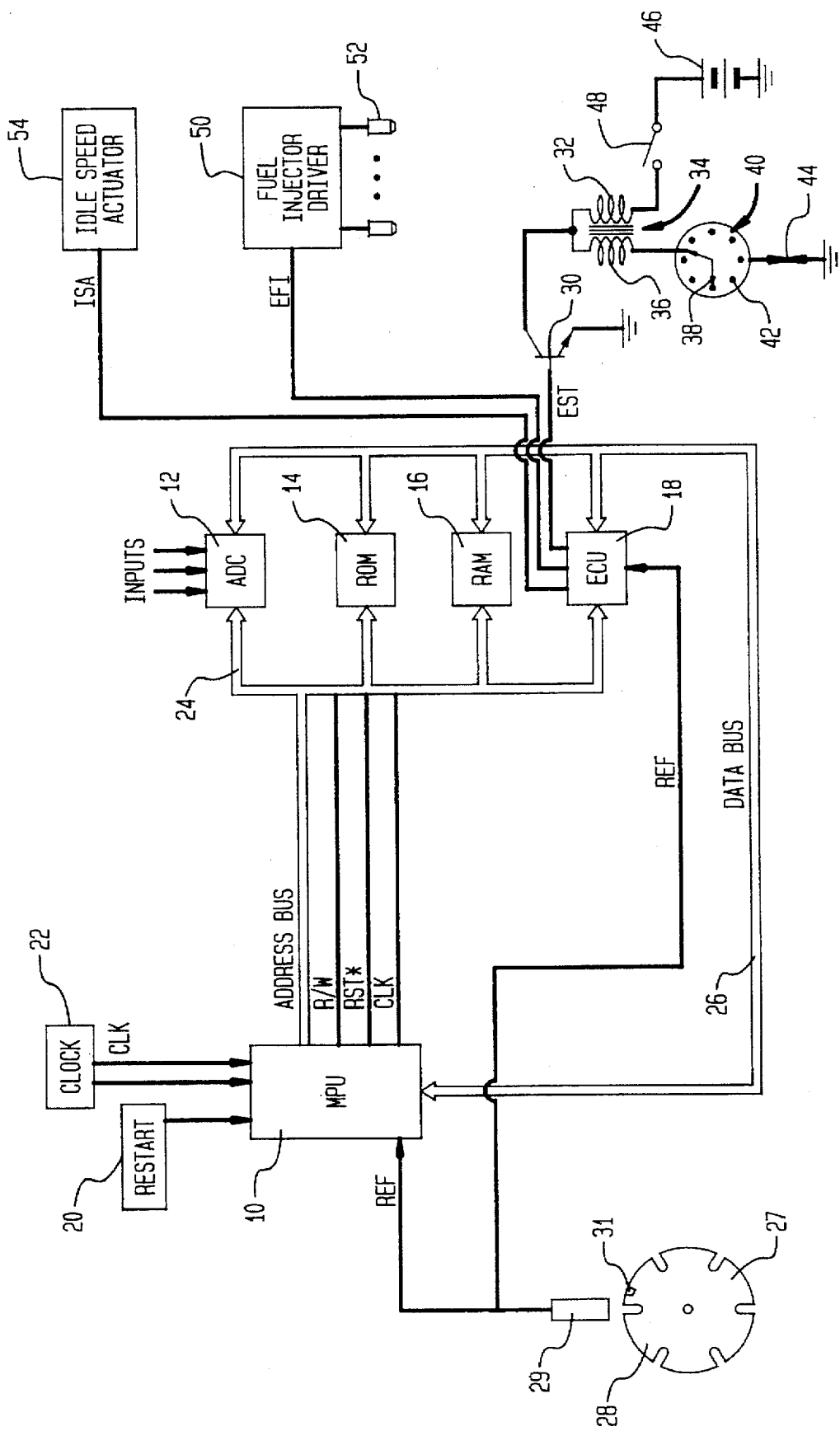
FIG. 2 is a schematic diagram of an electronic control system for carrying out the method of the invention.

An apparatus for carrying out the calculations and implementing the control commands is shown in FIG. 2 and is similar to that of the U.S. Pat. No. 4,351,306 to Luckman et al. The electronic control system includes a microprocessing unit (MPU) 10, an analog-to-digital converter (ADC) 12, a read-only memory (ROM) 14, a random access memory (RAM) 16 and an engine control unit (ECU) 18. The MPU 10 may be a microprocessor model MC-6800 manufactured by Motorola Semiconductor Products, Inc. Phoenix, Ariz. The MPU 10 receives inputs from a restart circuit 20 and generates a restart signal RST* for initializing the remaining components of the system. The MPU 10 also provides an R/W signal to control the direction of data exchange and a clock signal CLK to the rest of the system. The MPU 10 communicates with the rest of the system via a 16 bit address bus 24 and an 8-bit bi-directional data bus 26.

The ROM 14 contains the program steps for operating the MPU 10, the engine calibration parameters for determining the appropriate ignition dwell time and also contains ignition timing and fuel injection data in lookup tables which identify as a function of predicted engine speed and other engine parameters the desired spark angle relative to a reference pulse and the fuel pulse width. The MPU 10 may be programmed in a known manner to interpolate between the data at different entry points, if desired. Based on predicted engine speed, the spark angle is converted to time relative to the latest reference pulse producing the desired spark angle. The desired dwell time is added to the spark time to determine the start of dwell (SOD) time. In the same way, the start of injection (SOI) time is calculated from the fuel pulse width (FPW), the intake valve opening (IVO) time and the predicted speed.

The control words specifying a desired SOD, spark time, SOI and FPW relative to engine position reference pulses are periodically transferred by the MPU 10 to the ECU 18 for generating electronic spark timing signals and fuel injection signals. The ECU 18 also receives the input reference pulses (REF) from a reference pulse generator 27 which comprises a slotted ferrous disc 28 driven by the engine crankshaft and a variable reluctance magnetic pickup 29.

In the illustrated example the slots produce six pulses per crankshaft revolution or three pulses per cylinder event for a four cylinder engine. One extra slot 31 produces a synchronizing signal used in cylinder identification. A vital difference between this apparatus and that in the Luckman et al. patent is that the reference pulses are also directed to the MPU 10 to provide hardware interrupts for synchronizing the spark and fuel timing calculations to the engine position.

The EST output signal of the ECU 18 controls the start of dwell and the spark timing and is coupled to a switching transistor 30 connected with the primary winding 32 of an ignition coil 34. The secondary winding 36 of the ignition coil 34 is connected to the rotor contact 38 of a distributor, generally designated 40, which sequentially connects contacts 42 on the distributor cap to respective spark plugs, one of which is illustrated by the reference numeral 44. Of course, the distributor function can be accomplished by an electronic circuit, if desired.

The primary winding 32 is connected to the positive side of the vehicle battery 46 through an ignition switch 48. An EFI output signal of the ECU 18 is coupled to a fuel injector driver 50 which supplies actuating pulses to fuel injectors 52. To control idle speed a signal ISA is calculated by the ECU with the predicted engine speed in mind, and is coupled to an idle speed actuator 54 to provide an appropriate amount of air to the engine.

Figure 3A:
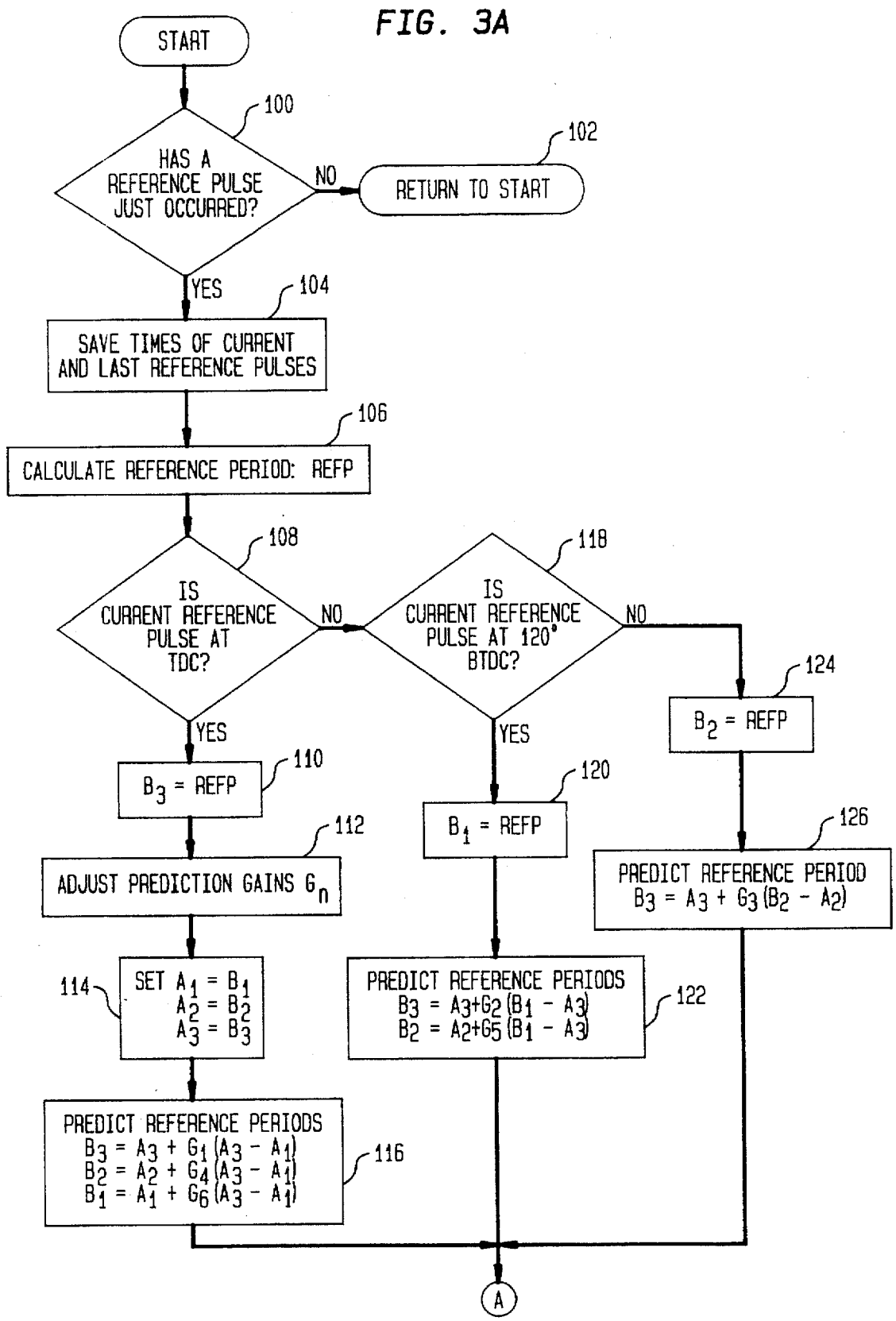
FIGS. 3A, 3B and 3C together comprise a flow chart of a typical engine speed control algorithm according to the invention.
Figure 3B:
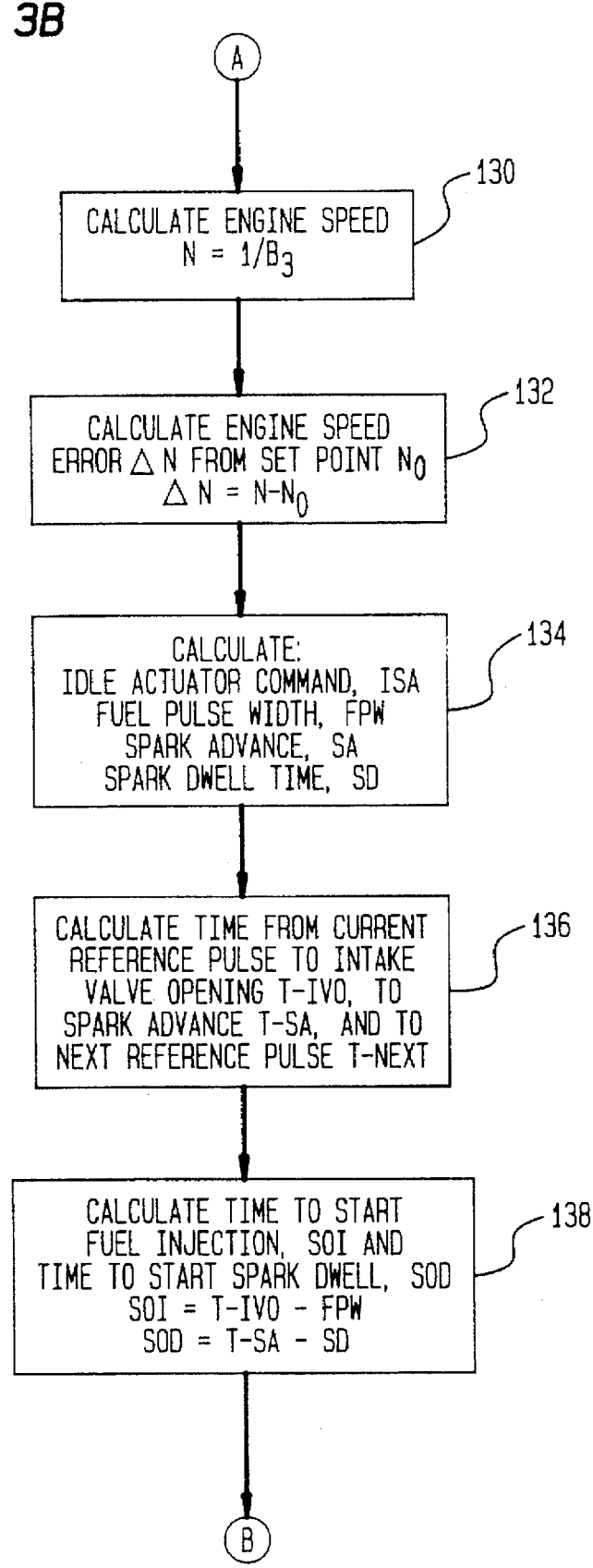
Figure 3C:
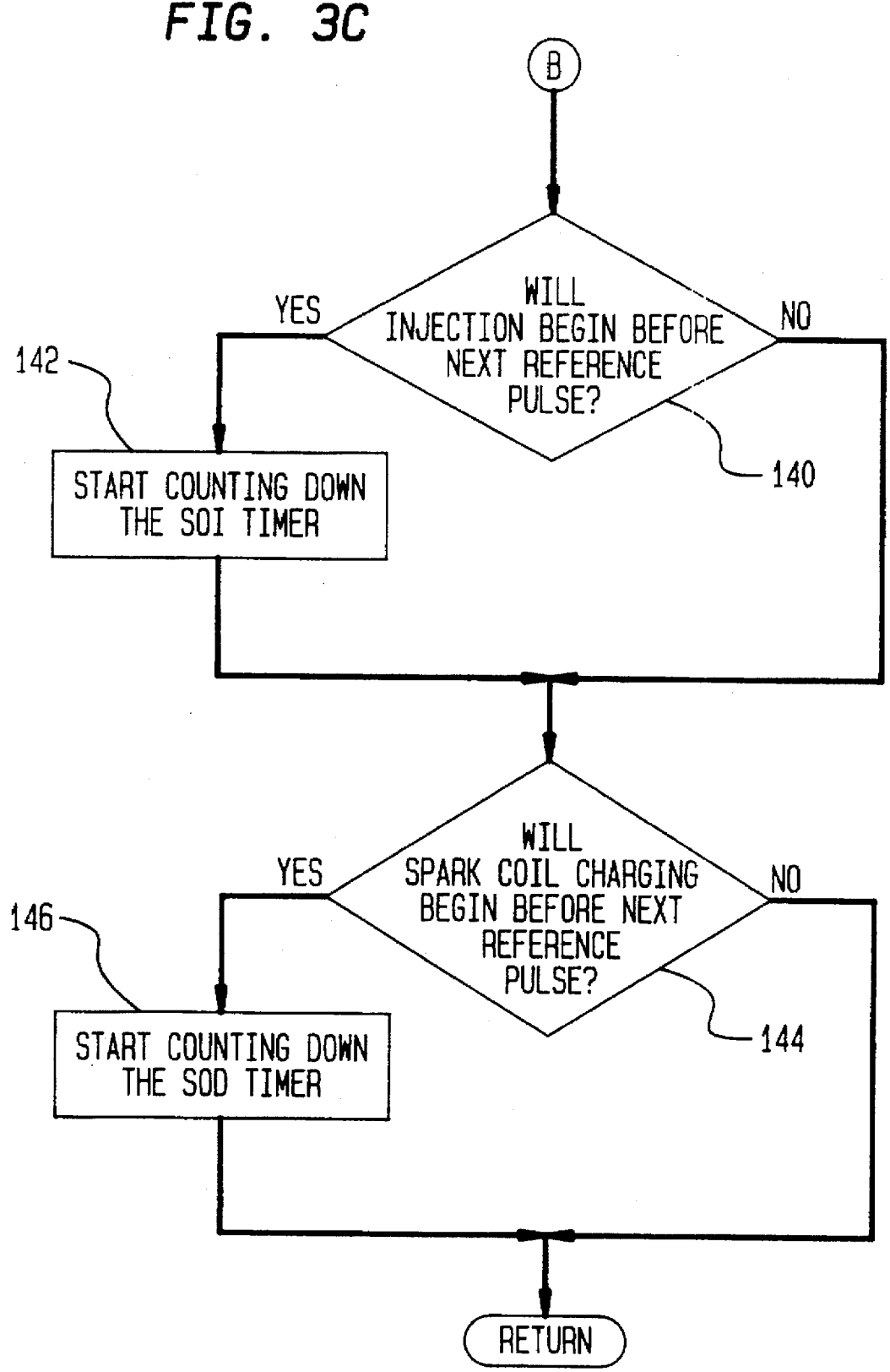

A flow chart of a typical control algorithm according to the invention is displayed in FIGS. 3A, 3B, and 3C and indicates the portion of the program embodied in the ROM 14 for determining the timing of spark and fuel control parameters. The illustrative embodiment is for an idle speed control wherein the engine speed is controlled to a target idle speed but the concept fully applies to other engine speed control where the target speed is established by operator input and powertrain conditions. The description of the program includes reference numerals in angle brackets which refer to the flow chart blocks corresponding to the described steps. The three figures are connected as indicated by the circled letters A and B. This illustrative program is for a four cylinder engine with three reference pulses per cylinder event with a pulse at TDC and each 60 degrees therefrom.

Referring to FIG. 3A, at the beginning (START) of the program the MPU is instructed to look for a reference pulse <100>. This assures that the program runs only at specified crankshaft positions and thus is synchronous with the engine. If a reference pulse is not received, the program returns to START <102>. When a reference pulse is detected, the times of the last pulse and the new or current pulse are stored <104>, and the reference period REFP is calculated as the elapsed time between those pulses <106>. If the current reference pulse is at TDC <108>, the last reference period was $B_3$ and thus $B_3$ is equal to REFP <110>. Since actual measurements of the reference periods $B_n$ have been made and the prediction errors can be ascertained, the prediction gains $G_m$ are adjusted <112>.

Then, for purposes of predicting reference periods in the current cylinder event, reference periods $A_n$ are set equal to the just measured periods $B_n$ <114>. The reference periods $B_n$ for the current cylinder event are then calculated from the formulas given above for the last pulse at 180 degrees <116>. If the current reference pulse is not at TDC <108>, it is decided whether it is at 120 degrees before TDC <118>. If it is, $B_1$ is set equal to REFP <120> and the values of $B_2$ and $B_3$ are predicted <122>. If the current reference pulse is not at 120 degrees before TDC, it must then be at 60 degrees before TDC <118>. Then, $B_2$ is set equal to REFP <124> and the current period $B_3$ is predicted <126>. Thus, at reference point A on the flow chart, all the current and or future periods in the current cylinder event have been predicted. Then, it is possible to proceed to the calculations relevant to spark and fuel timing.

Referring to FIG. 3B, the engine speed N is calculated from the reciprocal of the predicted $B_3$ <130> and an engine speed error delta-N is determined from the speed N and a speed target or set point $N_0$ <132>. This calculation is for an idle speed control and the set point $N_0$ is the desired idle speed. By substituting another desired target speed, any engine speed control can be implemented since the algorithm is designed to adjust spark and fuel to reduce or eliminate the speed error. The idle actuator command, ISA, as well as FPW, SA and SD are calculated <134>, and then the times from the current pulse to intake valve opening T-IVO, to the spark advance T-SA and to the next reference pulse T-Next are calculated <136>. Then SOI and SOD are calculated <138>. These are the events required to start the spark and fuel functions and must be started in time to complete those functions at the optimum time.

In FIG. 3C the program determines whether injection will begin before the next reference pulse <140>. This is readily calculated since SOI and the T-Next are known. If injection will begin in the current reference period, a SOI timer begins counting down to SOI <142>. If the injection will not begin in the current period <140>, no further action is taken at this time. It is next determined by comparing SOD and T-Next whether the spark coil charging should begin before the next reference pulse <144>. If so, the SOD timer is started <146>, and if not, no action is taken at the present time. Then the program returns to START and is repeated for the subsequent reference period when another reference pulse occurs.

Thus, it will be seen that by predicting the engine speed well in advance, the spark dwell and fuel injection will begin at the proper crank angle and by calculating the start of those events only from the most recent reference pulse high accuracy is assured. Further, by using only engine position data from the current combustion cycle the most accurate speed predictions are possible.

The embodiments of the invention in which an exclusive property or privilege is claimed are defined as follows:

1. A method of predicting engine speed of an internal combustion engine having a plurality of cylinders comprising the steps of:

generating a plurality of crankshaft position reference pulses for each cylinder event to thereby define a plurality of reference periods for each cylinder event;

measuring reference periods between adjacent ones of said reference pulses;

determining a trend of reference period change by comparing the most recent reference period with an earlier period;

projecting a future reference period at least one period beyond the current period by selecting a measured reference period from the most recently completed cylinder event as a base period, the base period having the same position in its cylinder event as the future reference period occupies in its respective cylinder event, determining a gain factor, and calculating the future reference period from the base period as adjusted by the product of the reference period change and the gain factor.

2. The invention as defined in claim 1 wherein the gain factor is adaptively determined by the steps of:

selecting a nominal gain;

projecting said reference period using the nominal gain as the gain factor;

measuring the said reference period;

calculating an error in the projected reference period; and adjusting the gain factor by an amount proportional to the error to reduce the error for subsequent projection of a similar reference period.

3. The invention as defined in claim 1 including projecting a future reference periods for current periods at different crank angle positions and wherein for each current period a different gain factor is determined for each future reference period.

4. A method of controlling speed of a multi-cylinder internal combustion engine to a target speed in a given crank angle wherein timed operating parameters regulate the engine speed, comprising the steps of:

generating a plurality of crankshaft position reference pulses for each cylinder event to thereby define a plurality of reference periods for each cylinder event;

measuring reference periods between adjacent ones of said reference pulses;

determining a trend of reference period change by comparing the most recently measured reference period with an earlier period;

projecting a future reference period at least one period beyond the current period and containing the given crank angle by selecting a measured reference period from the most recently completed cylinder event as a base period, the base period having the same position in its cylinder event as the future reference period occupies in its respective cylinder event, and calculating the future reference period from the base period as adjusted by the product of the reference period change and an adaptive gain factor;

determining from the target speed and the calculated future reference period a speed error;

determining timing of operating parameters required to mitigate the speed error;

if any parameter is timed to begin in the current reference period then beginning the parameter operation; and if any parameter is timed to begin after the current period, then iterating the above steps to attain a reference period when such parameter is to begin.

5. The invention as defined in claim 4 wherein the timed operating parameters include fuel injection pulse width, spark angle and spark dwell, and wherein the parameters are initiated by start of injection and start of dwell; and the step of beginning the parameter operation comprises beginning the start of injection and/or start of dwell.

6. The invention as defined in claim 4 wherein the gain factor is adaptively determined by the steps of:

selecting a nominal gain;

projecting said reference period using the nominal gain as the gain factor;

measuring the said reference period;

calculating an error in the projected reference period; and adjusting the gain factor by an amount proportional to the error to reduce the error for subsequent projection of a similar reference period.

* * * * *